F. K. HOFFMAN.
MOTOR CAR HEATER.
APPLICATION FILED NOV. 3, 1916.
1,246,098.
Patented Nov. 13, 1917.
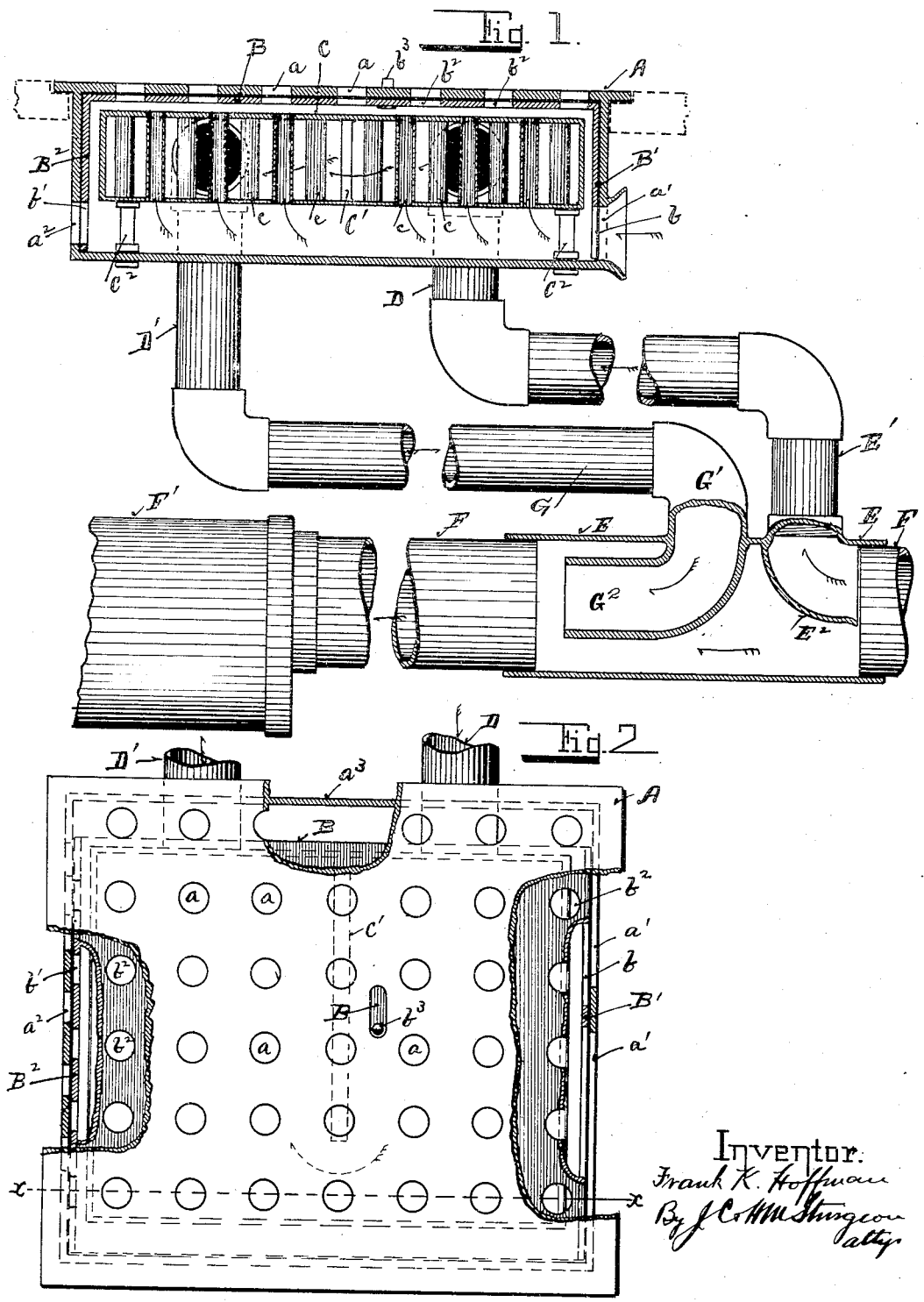

UNITED STATES PATENT OFFICE.

FRANK K. HOFFMAN, OF DUNKIRK, NEW YORK.

MOTOR-CAR HEATER.

1,246,098.    Specification of Letters Patent.    Patented Nov. 13, 1917.

Application filed November 3, 1916. Serial No. 129,352.

*To all whom it may concern:*

Be it known that I, FRANK K. HOFFMAN, a citizen of the United States, residing at Dunkirk, in the county of Chautauqua and State of New York, have invented certain new and useful Improvements in Motor-Car Heaters; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to heating apparatus and has for its object the provision of means adapted to heat the passenger compartment of a motor vehicle.

In carrying out my invention, I provide a box like receptacle adapted to be secured in an opening in the bottom of an automobile, and within this receptacle I place a hollow radiator, through which I cause a portion of the exhaust gas from the vehicle motor, to pass; and I provide the receptacle with an opening along its front edge, adapted to receive cold air therethrough, and the top of the receptacle with openings through which the heated air may pass.

This and other features of my invention will appear hereinafter in the specification and claim, and are illustrated in the accompanying drawings, in which:—

Figure 1 is a diagrammatic view partially in elevation, with parts broken away, and partially in section, on the line $x$—$x$, in Fig. 2.

Fig. 2 is a top or plan view of a portion of my invention with parts broken away.

In these drawings A, indicates a box like receptacle having spaced openings $a$, in the top thereof, a slot $a'$, in one edge thereof, and a series of spaced openings $a^2$, in the rear edge thereof.

Within the receptacle A, I provide a slidable plate B, having a down turned flange B', on its front edge, which flange is provided with a slot or cut away portion $b$, adapted to coincide with the slot $a'$, in the front edge of the wall of the receptacle A, so that the opening and slot $a'$, in the front wall of the receptacle A, will never be closed.

Along the rear edge of the plate B, is a down turned flange B², having spaced openings $b'$, adjacent to the lower edge thereof, which are adapted to coincide with the spaced openings $a^2$, in the rear wall of the receptacle A, when the plate B, is moved, as hereinafter described.

The plate B, is also provided with perforations $b^2$, in the top thereof, so spaced that when the plate B, is in the position thereof shown by full lines in Fig. 2, the holes or perforations in the top of the receptacle A, will coincide with the holes $b^2$, in the top of the slidable plate B, and the spaces between the spaced openings in the flange B², in the plate B, will close the spaced openings $b^2$, in the rear wall or edge of the receptacle A, as shown in Fig. 2. When, however, the plate B, is moved within the receptacle until the edge thereof contacts with the wall $a^3$, of the receptacle A, (see Fig. 2) the holes $a$, in the top plate of the receptacle A, will no longer coincide with the holes $b^2$, in the top of the inner plate B, the said holes $a$, being closed by the metal of the plate B, between the holes $b^2$; and the spaced holes $b'$, in the flange B², will co-incide with the spaced holes $a^2$, in the rear edge of the wall of the receptacle A, so that air entering the front edge of the receptacle A, through the slot $a'$, can travel rearwardly through the receptacle A, and escape therefrom through the openings $a^2$, in the wall thereof, instead of through the holes $a$, in the top plate of the receptacle A.

For operating the slidable plate B, I provide a stud $b^3$, which operates in a slot (see Fig. 2) in the upper wall of the receptacle A.

Within the receptacle A, I place a radiator C, composed of a box-like structure having a division wall C', extending from one edge thereof, part way across said box C, as shown by broken lines in Fig. 2. At one side of the division wall C', a pipe D, communicates with the interior of the radiator box C, by means of which the hot exhaust gas from the vehicle motor may enter the radiator box C; and at the opposite side of the division wall C', there is another tube D', communicating with the interior of the box C, by means of which the exhaust gas from the motor may escape from the radiator box C. The pipes D, and D', pass through openings in one of the edge walls of the receptacle A, to reach the radiator box C.

The radiator box C, is supported within the receptacle A, in spaced relation to the bottom thereof, by means of posts C², as shown in Fig. 1, so that air entering the front slot $a'$, can pass underneath the radiator box C. The radiator box I have shown in the drawings is provided with transverse vertical flues $c$, through which air may pass, and be heated; but it is apparent that any other form of radiator suitable to be used in such an apparatus, may be employed, without departing from the scope of my invention.

In Fig. 1, of the drawings I show a pipe connection E, in the exhaust F, leading from the motor (not shown) to the muffler F'. From the connection E, a branch pipe E', leads and is connected to the pipe D. Within the connection E, a deflector $E^2$, is constructed, adapted to deflect a portion of the exhaust motor gas into the branch pipe E'.

The undeflected portion of the exhaust gas passes on through the connection E, and exhaust pipe F, to the muffler F'. From the tube D', a pipe connection G, leads to another branch G', of the pipe connection E, preferably terminating in a nozzle $G^2$, within the connection E, so that the undeflected portion of the exhaust motor gas passing directly through the connection E, to the muffler F', will create a suction in the nozzle $G^2$.

In operation, when the motor vehicle is traveling forward, air enters the receptacle A, through the front slot $a'$, and hot motor gas enters the branch E', from the exit pipe F, travels through the radiator box C, around the division wall C', therein, out through the pipe D', and back into the exit pipe F, through the nozzle G', and while circulating through the radiator box, causes the air which enters the front slot $a'$, and which contacts with the heated surfaces of said radiator during its passage through the receptacle A, to become warm, so that as it escapes from the receptacle A, through the holes $a$, in the upper plate thereof, it is warm. When, however, it is desired to shut the warm air off, by means of the stud pin $b^3$, the plate B is moved toward the receptacle wall $a^3$, which operates to close the openings $a$, in the top wall of the receptacle A, and open the holes $a^2$, in the rear wall of the receptacle A, so that instead of air being heated and escaping into the body of the vehicle, it will pass out of the holes $a^2$.

Having thus shown and described the construction and operation of my improved heating apparatus, what I claim as new and desire to secure by Letters Patent, is:—

In an apparatus of the class described, a box-like receptacle having spaced perforations in the top and rear edge thereof and an air intake slot in the front edge thereof, a slidable plate within said receptacle having spaced perforations adapted to register with the perforations in the top of said receptacle at one position of said plate and to close the perforations in the top of said receptacle at the other position of said plate, a downwardly depending flange on said slidable plate having spaced perforations adapted to register with the spaced perforations in the rear edge of said receptacle when the perforations in the top thereof have been closed by said plate, and to close the perforations in said rear edge when the top perforations are opened, a hollow radiator supported within said receptacle in spaced relation to the walls thereof, a tubular connection between the exhaust pipe of a motor and said radiator, means to deflect a portion of the exhaust gas from the motor exhaust pipe into said tubular connection, and means to convey said exhaust gas from said radiator, substantially as set forth.

In testimony whereof I affix my signature.

FRANK K. HOFFMAN.